United States Patent
Harris et al.

(10) Patent No.: US 7,336,966 B2
(45) Date of Patent: Feb. 26, 2008

(54) SYSTEM AND METHOD FOR DELAY REDUCTION IN A NETWORK

(75) Inventors: John M. Harris, Chicago, IL (US); Ronald T. Crocker, St. Charles, IL (US); Thomas B. Hart, West Dundee, IL (US)

(73) Assignee: Motorola, Inc., Schaumburg, IL (US)

( * ) Notice: Subject to any disclaimer, the term of this patent is extended or adjusted under 35 U.S.C. 154(b) by 451 days.

(21) Appl. No.: 10/996,212

(22) Filed: Nov. 23, 2004

(65) Prior Publication Data

US 2006/0111128 A1    May 25, 2006

(51) Int. Cl.
*H04Q 7/20* (2006.01)
(52) U.S. Cl. .................. 455/466; 455/450; 455/452.2; 455/436; 455/464; 455/422.1
(58) Field of Classification Search ................ 455/466, 455/450, 452.2, 436, 464, 422.1, 412.2, 434
See application file for complete search history.

(56) References Cited

U.S. PATENT DOCUMENTS

| | | | |
|---|---|---|---|
| 5,546,388 A * | 8/1996 | Lin | 370/389 |
| 5,838,720 A * | 11/1998 | Morelli | 455/574 |
| 5,930,706 A | 7/1999 | Raith | |
| 6,169,731 B1 | 1/2001 | Stewart et al. | |
| 6,337,984 B1 * | 1/2002 | Hong et al. | 455/439 |
| 6,546,009 B1 * | 4/2003 | Begeja et al. | 370/389 |
| 7,020,613 B2 * | 3/2006 | Chang et al. | 370/264 |
| 7,089,027 B1 * | 8/2006 | Welch et al. | 455/521 |
| 2004/0037309 A1 * | 2/2004 | Hauck et al. | 370/462 |
| 2005/0009547 A1 | 1/2005 | Harris et al. | |
| 2005/0036507 A1 * | 2/2005 | Hall et al. | 370/463 |

FOREIGN PATENT DOCUMENTS

| | | |
|---|---|---|
| WO | WO 96/27961 | 9/1996 |
| WO | WO 99/46875 | 9/1999 |

* cited by examiner

*Primary Examiner*—Jean Gelin
*Assistant Examiner*—Huy D. Nguyen

(57) ABSTRACT

A system and method for reducing the transmission delay of messages sent through a network from a source mobile unit (112) to a destination mobile unit (114). Portions of a data message are received (202). The portions of the data message are decoded (204) and a type of the data message is determined from the decoded portions. Before the entire data message has been received, processing and service actions are performed as a result of receiving the data message (206) based at least in part upon the type of the data message.

17 Claims, 3 Drawing Sheets

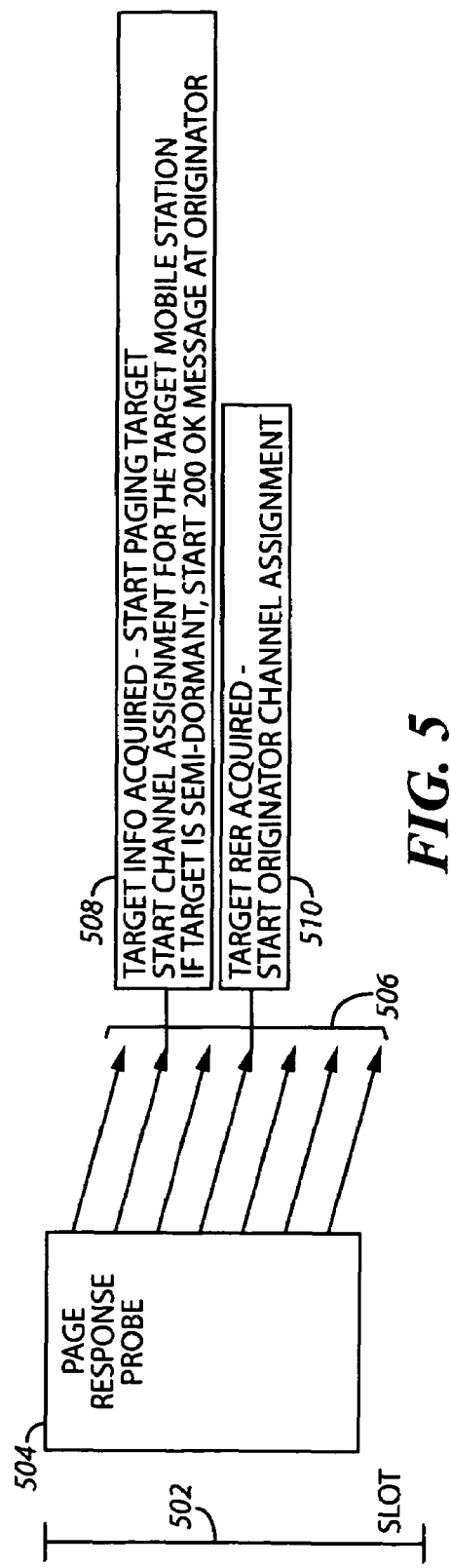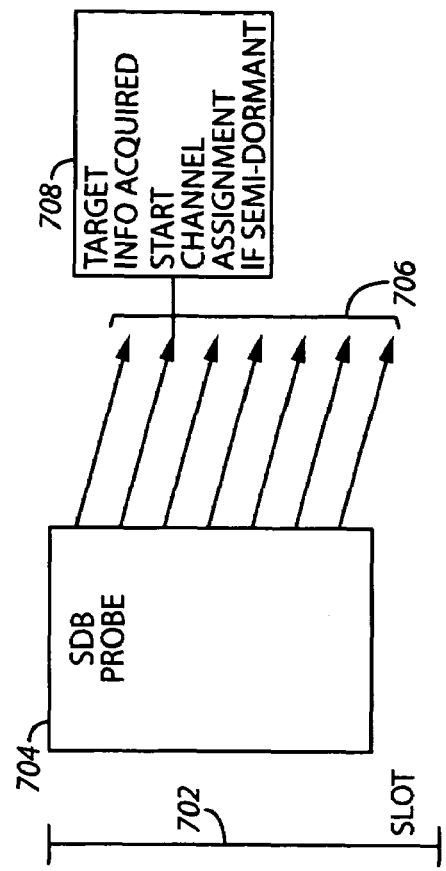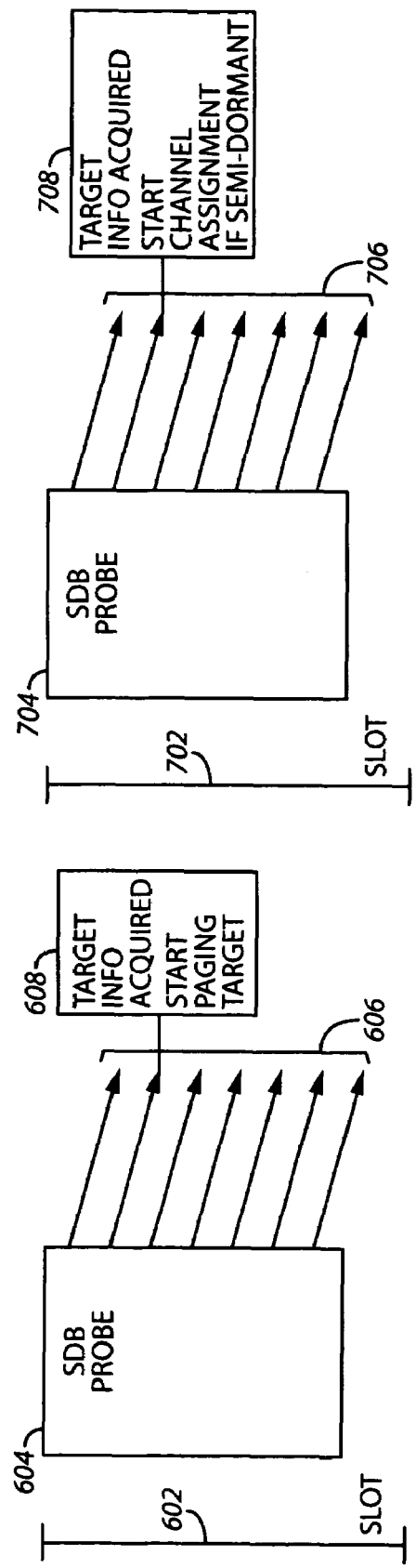

SYSTEM AND METHOD FOR DELAY REDUCTION IN A NETWORK

FIELD OF THE INVENTION

This invention generally relates to transmitting communications in networks. More specifically, it relates to transmitting communications efficiently within these networks.

BACKGROUND OF THE INVENTION

In modern telecommunication systems, messages are sent between mobile stations (MSs) operating in different cells or sectors of a network. When a mobile station wants to send a message across the network, it monitors control communication channels to determine configuration information before sending an initial message (or probe) to the network. The probe may be one of several kinds: a message requesting the network to allocate a channel to the mobile station, (e.g., origination or Page Response Messages) a message transmission by the mobile station (e.g., a Short Message Service Message) or both (e.g., a Reconnect with Short Data Burst (Reconnect w/SDB).

In previous systems, when received by the network, the probe message is processed only after its entire contents have been successfully received. In other words, the network does not perform an action until the entire probe message has been received correctly. A setup delay occurs because the system must wait until the whole message has been received and verified as correct before any action is taken.

In the above-mentioned previous systems, the setup delay time for message transmission can be significant. In many situations, the increased delay time results in degradation of the quality of service as customers must wait a significant amount of time for a connection to be made. The delay may also increase congestion in the network and result in lost messages. Such degradation in service quality frequently results in increased user frustration and a less-than-optimum user experience.

BRIEF DESCRIPTION OF THE DRAWINGS

FIG. 5 is a diagram showing the processing of a page response message according to various embodiments of the present invention;

FIG. 6 is a diagram showing the processing of a SDB probe message according to various embodiments of the present invention; and FIG. 7 is a diagram showing another approach for processing a SDB probe according to various embodiments of the present invention.

Figure 1:
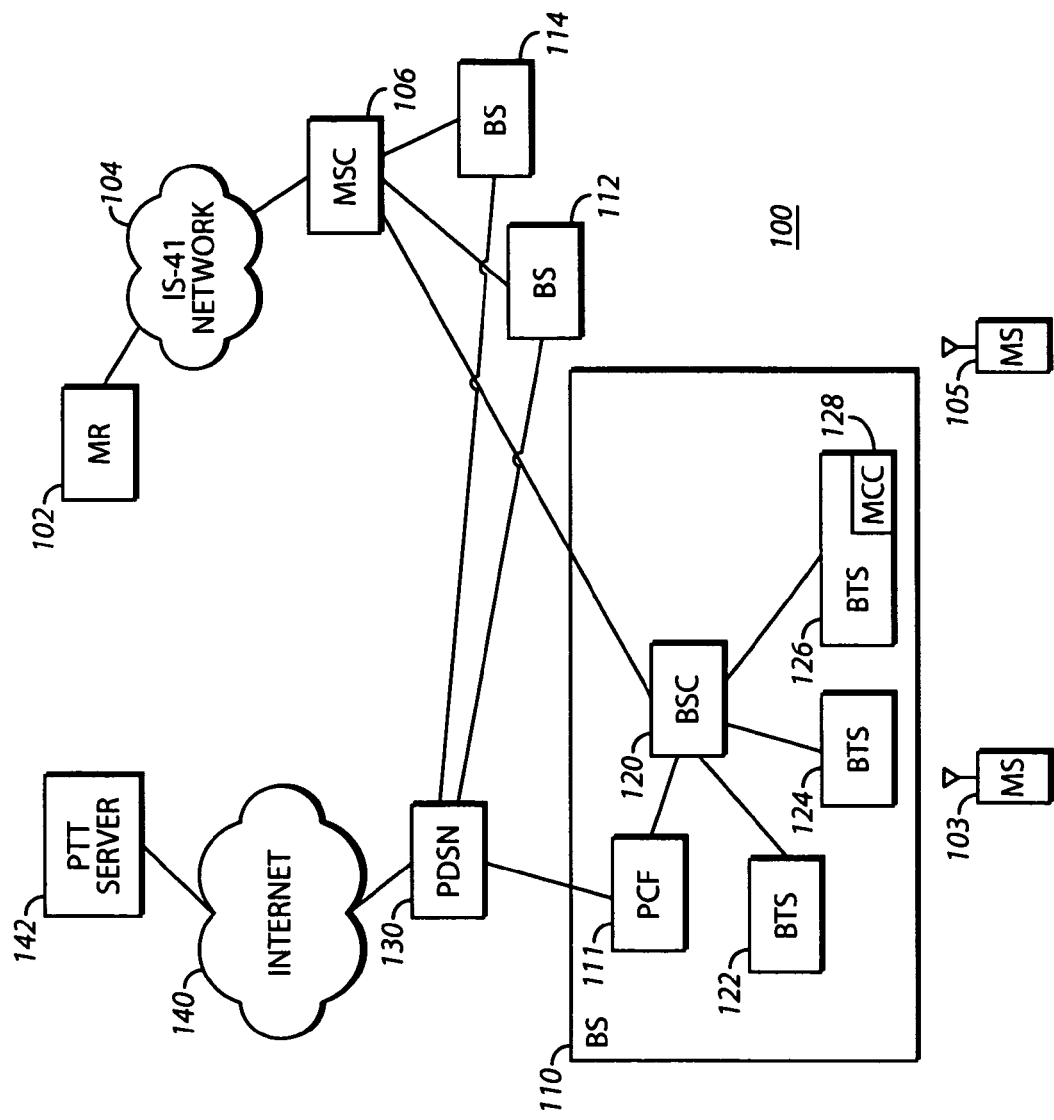
FIG. 1 is a block diagram showing a system for reducing the connection delay in a wireless network according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method for reducing delay in a network performs service actions relating to a probe message before the entire contents of the message have been received. Since actions are initiated before the entire contents of the message have been received, the delay time in establishing connections between mobile stations is reduced and system performance is enhanced.

In many of these embodiments, portions of a data message are received. The portions of the data message are decoded and a determination of the type of the data message is made based upon the decoded portions of the data message. Before the entire data message has been received, processing and service actions are performed. The nature of these actions may be determined by the type of message.

The message received may be an origination message, a reconnect message, a data burst message, a Reverse-Short Data Burst/Short Messaging Service (R-SDB/SMS) message, a page response message, a registration message, a presence update message, a 200 OK message, a Reconnect w/SDB message, or a dispatch message. Other examples of data messages are possible.

In some of these embodiments, after portions of the data message have been received, the identity of the destination mobile unit may be determined and a connection may be established between the source mobile unit and the destination mobile unit. The destination mobile unit may be a cellular telephone, a pager, a personal digital assistant (PDA), a web server or other mobile wireless device.

In some others of these embodiments, the data message may include a radio frequency (RF) environment report and the resultant action may include allocating a communication channel. In other examples, the data message may include a semi-dormant originator address and the resultant action may be to send a channel assignment message. In still another example, the data message may be a talker arbitration request and action taken may be forwarding a talker arbitration request/invite to a server.

In other embodiments, the likelihood that the data message was correctly received is also measured. A priority for the data message is determined based upon the likelihood the message was correctly received. The data message is then transmitted with the determined priority.

Thus, the present approaches significantly reduce the time required to establish connections in a network between mobile stations. By reducing the time required to establish connections, the quality of service and the user experience are enhanced. Message loss and network congestion are also reduced in the network.

Referring now to FIG. 1, an example of a system for reducing delays in transmitting messages between mobile stations in a network is described. A network 104 is coupled to a mobile switching center (MSC) 106. In this example, the network 104 is a IS-41 Network and conforms to the standards developed by the Telecommunications Industry Association (TIA) Standards Committee. However, the network 104 may be any other type of telecommunication network as well. Messages and data are transmitted between different entities within the network 104 using various telecommunication protocols and technologies. The network 104 is coupled to a message register (MR) 102.

The MSC 106 provides an interface between the base station subsystem and the switching subsystem of the mobile phone network. In this regard, the MSC 106 is coupled to a plurality of Base Stations (BSs) 110, 112 and 114. BS 110 comprises a Base Station Controller (BSC) 120 and a plurality of Base Transceiver Systems (BTSs) 122, 124 and 126. The BSC 120 provides connectivity between the MSC 106 and the plurality of BTSs 122, 124 and 126. BS 112 and 114 also provide similar connectivity between their corresponding BSC (not shown), their corresponding BTSs (not shown) and the MSC 106.

Each of the BTSs 122, 124 and 126 include at least one MultiChannel Controller (MCC). In the system of FIG. 1, a MCC 128 is shown associated with the BTS 126. The MCC 128 connects the BTS 110 with mobile stations (MSs). As shown in FIG. 1, the MCC 128 connects the BTS 126 with the mobile station (MS) 105. The BTS 110 provides the control and transmission functionality needed to enable the BSC 120 to communicate with the MS 105. A packet control function (111) is connected to the BSC 120.

Messages are exchanged between the MS 105 and the MR 102 to implement a Short Messaging Service. The MS 105 sends a message to the MR 102 via the MCC 128, BTS 126, BSC 120, MSC 106 and IS-41 Network 104. The MR 102 sends messages to the MS 105 using the IS-41 Network 104, MSC 106, BSC 120, BTS 126, and MCC 128.

Messages are exchanged between the MS 105 and a second mobile station 103. The mobile stations 103 and 105 may be any type of wireless mobile device. For example, the mobile stations 103 and 105 may be cellular phones, pagers, or personal digital assistants. Other examples of mobile stations are possible.

Each of the BSs 110, 112 and 114 are operably coupled to a Packet Data Services Node (PDSN) 130, which is operably coupled to the Internet 140. A Push-to-talk Server (PTT Server) 142 is operably coupled to the Internet 140. By way of these couplings, it is possible for the mobile station 103 to communicate with the second mobile station 105 via the PTT Server 142 by sending a signal through the BS 110, the PDSN 130, the Internet 140, the PTT Server 142, and back through the Internet 140, the PDSN 130, the BS 110, to the second MS 105.

By way of example, the data message type may be a data burst message, a Reverse-Short Data Burst/Short Messaging Service (R-SDB/SMS) message, a page response message, a registration message, a presence update message, a 200 OK message, or a dispatch message. Other types of messages are possible. Depending upon the determined message type, the actions performed may include allocating communication channels, forwarding messages, and speculatively paging a mobile. Additional service actions are possible.

In one example of the operation of FIG. 1, a data message is transmitted between a source mobile station 103 and a destination mobile station 105. At the BSC 120, portions of the data message are received. The portions of the data message are decoded and a determination is made of the type of the data message from the decoded portions. Before the entire data message has been received, the BSC 120 performs processing and service actions. Alternatively, the decoding and/or processing may be performed at the BTSs 122, 124, and 126 the mobile station 103, or a combination of these or other elements. Examples of processing particular types of data messages are described in connection with FIGS. 3-7 and presented elsewhere in this application.

In this example, the BSC 120 may include a receiver having an input line and a transmitter having an output line. The input line receives a data message. The BSC 120 may also include a controller, which is coupled to the input line of the receiver and the output line of the transmitter. The controller is programmed to receive the data message, decode the data message, and form a control message. Before the first message has been completely received on the input line of the receiver, the controller causes the control message to be transmitted on the output line of the transmitter. The control message is comprised of information that is used to form a link on a communication channel or initiate the performance of services or other actions. In addition, the functionality of the transmitter, receiver, and controller may be placed in other system elements or split across these system elements.

Other information besides data type may be extracted from the message and used in the processing action. For example, after portions of the data message have been received, the identity (or potential identity) of the destination mobile unit may be determined and a connection may be established between the source mobile unit and the destination mobile unit.

In another example of the operation of the system of FIG. 1, the data message may be a radio frequency (RF) environment report and receipt and identification of this report may cause the allocation of a communication channel. In still another example, the data message may include a semi-dormant originator address, which is identified by the system. A channel assignment message may be sent as a result of receiving the message. In still another example, the data message may be a talker arbitration request and action taken may be forwarding a talker arbitration request/invite to a server in the network.

In other examples, the likelihood that the data message was correctly received is also measured by the BSC 120. A priority for the data message can be determined at the BSC 120 based upon the likelihood the message was correctly received at the destination. The data message may be then transmitted with the determined priority.

The BSC 120 may also determine the originator address of the data message and a potential identity of the destination mobile unit may be determined based upon the originator address. For example, the BSC 120 may maintain a buddy list or recent call list, which may be stored in a memory device. Based upon an evaluation of the entries in the buddy list or the recent call list, the destination mobile unit may be speculatively paged using the potential identities. Specifically, the BSC 120 may determine the entries on the list that have been called most often or are otherwise identifiable as having a high probability of being potential destinations.

Figure 2:
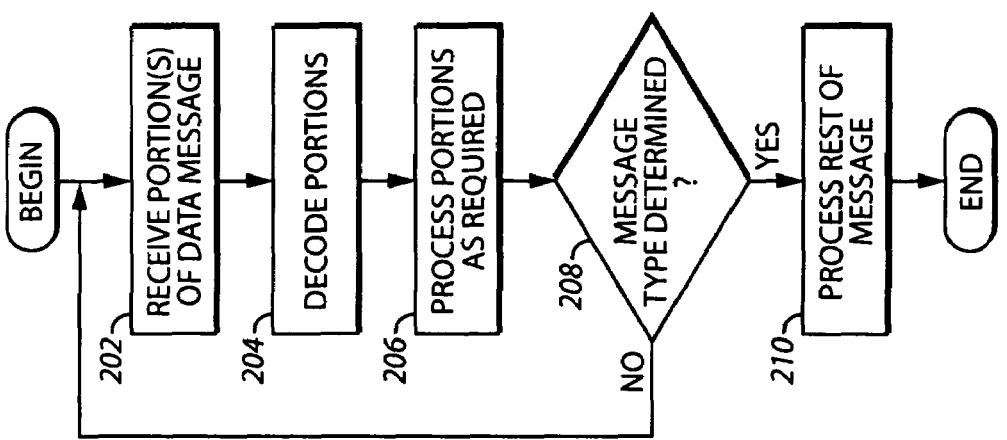
FIG. 2 is a flow chart showing a method for reducing the connection delay in a wireless network according to various embodiments of the present invention.

Referring now to FIG. 2, an example of an approach for decreasing delay time in processing messages is described. At step 202, at least one portion of a message is received. As described previously, the message may be a data burst message, a Reverse-Short Data Burst/Short Messaging Service (R-SDB/SMS) message, a page response, a registration message, a presence update, a 200 OK message, a dispatch message, or some other type of message.

At step 204, the received portions of the data message are decoded. At step 206, the decoded portions are processed as required. With this step, a message type may be determined. Alternatively, some other characteristic of the message may be determined. When the message type is determined, an action may be taken before the complete message has been received. Examples of these actions are described elsewhere in this application.

At step 208, it is determined if the message type has been found. If the answer is affirmative, then processing continues at step 210 where the rest of the message is processed. If the answer is negative at step 208, then control returns to step 202 where additional portions of the message are received and processing continues as described above. In this case, the processing continues until the type or other characteristic information of the message can be determined so that a corresponding action can be performed.

Referring now to FIGS. 3-7, examples of how various messages are processed are described. It will be understood that the messages and actions described with respect to these figures are examples only, and can be changed to fit the requirements of a specific system and/or network.

Figure 3:
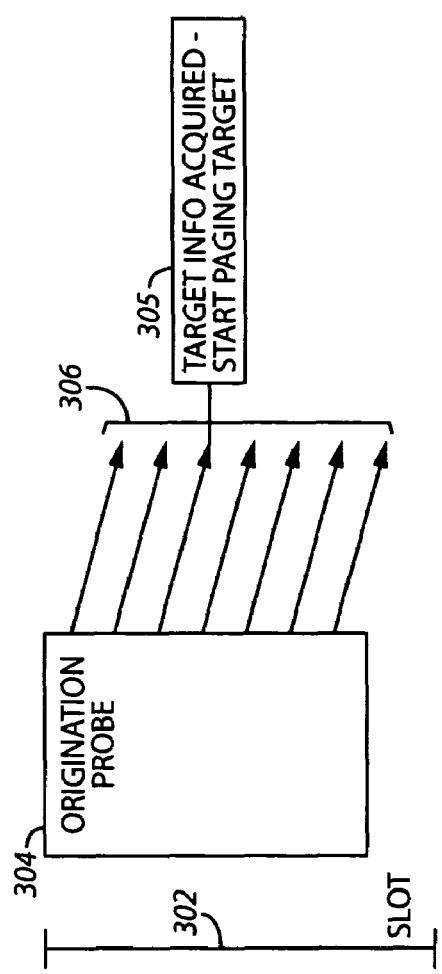
FIG. 3 is a diagram showing the processing of an origination message according to various embodiments of the present invention.

Referring now specifically to FIG. 3, an example of the processing of an origination probe message is described. An origination probe message 304 is transmitted in a time slot 302. The origination probe message is sampled a plurality of times 306. The purpose of the sampling is to determine a type of message before the end of the message 304 has been received. Alternatively, some other characteristic of the message 304 may be determined instead of the message type.

At step 305, the information concerning the type has been acquired. Also, addition information (target identity) has been acquired such that the target can be located and paged. Thus, the action (paging the target) is performed before the entire contents of the origination probe message have been received.

The approach described in FIG. 3 results in significantly reduced delay time. If the target mobile device is a cell phone device, the user at the device can start listening to audio portions of messages sooner. Specifically, the time until a Talk Permit Tone (TPT) is acquired is significantly reduced. In cases where the origination probe message is lost and must be retransmitted, the time savings are even greater.

Figure 4:
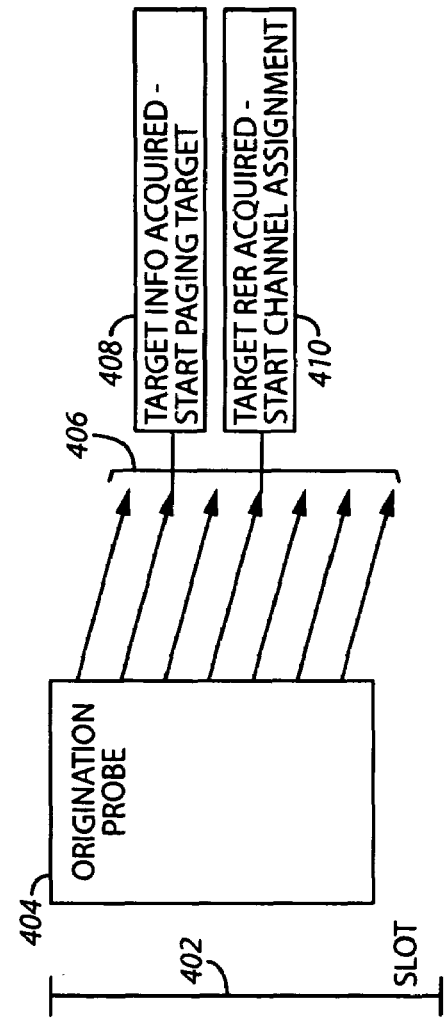
FIG. 4 is a diagram showing another approach for processing an origination message according to various embodiments of the present invention.

Referring now to FIG. 4, another example of the processing of an origination probe message is described. An origination probe message 404 is transmitted in a time slot 402. The origination probe message is sampled a plurality of times 406. The purpose of the sampling is to determine the type of message before the end of the origination probe message 404 has been received. Alternatively, some other characteristic of the message 404 may be determined instead of the message type.

At step 408, the information concerning the type has been acquired. Also, additional information (target identity) has been acquired such that the target can be paged. Then, at step 410, the target RER (RF environment report) is acquired and channel assignment is performed. In one approach, steps 408 and 410 may be performed sequentially. However, in other approaches, the steps may overlap. The RER contains RF signal strength measurements made by the mobile station, which enables the network to allocate the mobile station dedicated or shared resources. Thus, the actions (paging the target and performing channel assignment) are performed before the entire contents of the origination probe message have been received.

The approach described in FIG. 4 results in significantly reduced delay times and, if the target device is a cellular phone, a user at the device can start listening to the audio portions of messages sooner. Specifically, the time until a Talk Permit Tone (TPT) is acquired is significantly reduced. In addition, the time until the target mobile station is on the channel is also reduced. In cases where the origination probe message is lost and must be retransmitted, the time savings are even greater.

Referring now to FIG. 5, an example of the processing of a page response probe message is described. A page response probe message 504 is transmitted in a time slot 502. The page response probe message 504 may be formed in response to receiving a page message. The page response probe message is sampled a plurality of times 506. The purpose of the sampling is to determine the type of message before the end of the message 504 has been received. Alternatively, some other characteristic of the message 504 may be determined instead of the message type.

At step 508, the information concerning the type has been acquired. Also, additional information (target identity) has been acquired such that the target can be paged. At this step, channel assignment for the target mobile station is started. If the target is semi-dormant, the 200 OK/talk permit tone at originator may be started. At step 510, the target RER has been acquired such that originator channel assignment can be performed. Thus, the actions of paging the target and performing channel assignment are performed before the entire contents of the origination probe message 504 have been received.

The approach described in FIG. 5 results in significantly reduced delay times and, if the target mobile device is a cellular phone, a user at the device can start listening to the audio portions of messages sooner. Specifically, the time until a Talk Permit Tone (TPT) is acquired is significantly reduced. In addition, the time until the target mobile station is on the channel is also reduced. In cases where the page response probe message is lost and must be retransmitted, the time savings are even greater.

Referring now to FIG. 6, an example of the processing of a Short Data Burst (SDB) probe message is described. An SDB probe message 604 is transmitted in a time slot 602. The origination probe message is sampled a plurality of times 606. The purpose of the sampling is to determine the type of message before the end of the message 604 has been received. Alternatively, some other characteristic of the message 604 may be determined besides the message type.

At step 608, the information concerning the type has been acquired. Also, additional information (target address) has been acquired such that the target can be paged. Thus, the action (paging the target) is performed before the entire contents of the origination probe message have been received.

The approach described in FIG. 6 results in significantly reduced delay times and, if the target mobile device is a cellular phone, a user at the device can start listening to the audio portions of messages sooner. Specifically, the time until a Talk Permit Tone (TPT) is acquired is significantly reduced. In addition, the time until the target mobile station is on the channel is also reduced. In cases where the SDB probe message is lost and must be retransmitted, the time savings are even greater. The time savings also may vary depending upon whether the mobile stations are in a dormant or semi-dormant state of operation.

Referring now to FIG. 7, another example of the processing of a SDB probe message is described. An SDB probe message 704 is transmitted in a time slot 702. The SDB probe message is sampled a plurality of times 706. The purpose of the sampling is to determine the type of message before the end of the message 704 has been received.

Alternatively, some other characteristic of the message 704 may be determined besides the message type.

At step 708, the information concerning the type has been acquired. Also, additional information (address of the originator) has been acquired such that channel assignment can be performed if the target is in semi-dormant state. Thus, the action (channel assignment) is performed before the entire contents of the origination probe message have been received.

The approach described in FIG. 7 results in significantly reduced delay times and, if the target mobile device is a cellular phone, the device can start listening to the audio portions of messages sooner. Specifically, the time until a Talk Permit Tone (TPT) is acquired is significantly reduced. In addition, the time until the target mobile station is on the channel is also reduced. In cases where the SDB probe message is lost and must be retransmitted, the time savings are even greater. The time savings also may vary depending upon whether the mobile stations are in a dormant or semi-dormant state of operation.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for reducing the transmission delay of messages sent through a network from a first mobile unit, the method comprising:
   receiving portions of a data message from the first mobile unit;
   decoding the portions of the data message and determining from the decoded portions a type of the data message and an originator address of the data message; and
   before the entire data message has been received, performing processing and service actions as a result of receiving the data message based at least in part upon the type of the data message and determining a potential identity of at least one second mobile unit based at least in part upon the originator address.

2. The method of claim 1 wherein receiving portions of a data message comprises receiving a message selected from a group comprising an origination message, a reconnect message, a data burst message, a Reverse-Short Data Burst/Short Messaging Service (R-SDB/SMS) message, a page response, a registration message, a presence update, a 200 OK message, a Reconnect w/SDB message, and a dispatch message.

3. The method of claim 1 wherein the decoding comprises determining an identity of at least one second mobile unit and the performing comprises establishing a connection between the first mobile unit and the at least one second mobile unit.

4. The method of claim 1 wherein the decoding comprises determining that the type of data message is a radio frequency (RF) environment report and the performing comprises allocating a communication channel.

5. The method of claim 1 wherein the decoding comprises determining that the type of data message is a semi-dormant originator address and the performing comprises sending a channel assignment message.

6. The method of claim 1 wherein the decoding comprises determining the type of data message is a talker arbitration request and the performing comprises forwarding the talker arbitration request/invite to a server.

7. The method of claim 1 wherein the performing further comprises determining the potential identity of the at least one second mobile unit at least in part by using a data structure selected from a buddy list and a recent call list, and speculatively paging the at least one second mobile unit using the potential identity.

8. The method of claim 1 wherein the transmitting comprises sending a channel assignment message.

9. A method for reducing the transmission delay of messages sent through a network from a first mobile unit, the method comprising:
   receiving portions of a data message from the first mobile unit;
   decoding the portions of the data message and determining from the decoded portions a type of the data message;
   before the entire data message has been received, performing processing and service action as a result of receiving the data message based at least in part upon the type of the data message;
   measuring a likelihood that the data message was correctly received;
   determining a priority for the data message based upon the likelihood the message was correctly received; and
   transmitting the data message with the determined priority.

10. A method for reducing the transmission delay of messages sent through a network from a first mobile unit, the method comprising:
    receiving portions of a data message from the first mobile unit;
    decoding the portions of the data message and determining from the decoded portions a type of the data message;
    before the entire data message has been received, performing processing and service action as a result of receiving the data message based at least in part upon the type of the data message;
    measuring a likelihood that the data message was correctly received;
    determining a priority for the data message based upon the likelihood the message was correctly received; and
    allocating resources for the data message with the priority.

11. The method of claim 10 wherein determining a priority comprises determining a first priority when the data message is a page response message with an address matching a previously paged address;
    determining a second priority when the data message is a page response message with an address not matching a previously paged address; and
    determining a third priority when the data message is a message other than a page response message.

12. A method for reducing the transmission delay of messages sent through a network from a first mobile unit, the method comprising:
    receiving portions of a data message from the first mobile unit;
    decoding the portions of the data message and determining from the decoded portions a type of the data message and identifying that the data message is a page response; and
    before the entire data message has been received, performing processing and service action as a result of receiving the data message based at least in part upon the type of the data message, performing determining an address of the first mobile unit and performing generating a presence update that the address of the first mobile unit is determined.

13. A method for reducing the transmission delay of messages sent through a network from a first mobile unit, the method comprising:

receiving portions of a data message from the first mobile unit;

decoding the portions of the data message and determining from the decoded portions a type of the data message and identifying that the data message is a page response; and before the entire data message has been received, performing processing and service action as a result of receiving the data message based at least in part upon the type of the data message, performing determining an address of the first mobile unit and performing generating a channel assignment message indicating that the address is determined and that the first mobile unit is operating in a semi-dormant state.

14. A method for reducing the transmission delay of messages sent through a network from a first mobile unit, the method comprising:

receiving portions of a data message from the first mobile unit;

decoding the portions of the data message and determining from the decoded portions a type of the data message and identifying that the data message is a page response;

before the entire data message has been received, performing processing and service action as a result of receiving the data message based at least in part upon the type of the data message and performing determining an address of the first mobile unit; and validating an address from a destination mobile unit matches the determined address of the first mobile unit.

15. A method for reducing the transmission delay of messages sent through a network from a first mobile unit, the method comprising:

receiving portions of a data message from the first mobile unit;

decoding the portions of the data message and determining from the decoded portions a type of the data message and identifying that the data message is an origination message;

before the entire data message has been received, performing processing and service action as a result of receiving the data message based at least in part upon the type of the data message, performing determining an address of the mobile unit and performing determining an address for at least one second mobile unit based at least in part on portions of the data message; and determining that a semi-dormant mobile unit is in a selected sector and has an address of the at least one second mobile unit.

16. A system for reducing delays in message transmission comprising:

a receiver having an input line, the input line receiving a first message;

a transmitter having an output line;

a controller, coupled to the input line of the receiver and the output line of the transmitter, the controller programmed to receive the first message, decode the first message, form a second message, and, before the entire first message has been completely received on the input line of the receiver, cause the second message to be transmitted on the output line of the transmitter and wherein the controller comprises means for assigning a page assignment a higher priority based upon evidence the first message was correctly received by a destination mobile unit; and wherein the second message is comprised of information for forming a link on a communication channel.

17. The system of claim 16 wherein the first message is selected from a group comprising an origination message, a reconnection message, a data burst message, a Short Data Burst/Short Messaging Service (R-SDB/SMS), a page response, a registration message, a presence update, a 200 OK message, and a dispatch message.

* * * * *